United States Patent
Nagata

(10) Patent No.: US 10,771,637 B2
(45) Date of Patent: Sep. 8, 2020

(54) IMAGE FORMING APPARATUS, INFORMATION PROCESSING SYSTEM, IMAGE FORMING METHOD, AND PROGRAM

(71) Applicant: Konica Minolta, Inc., Chiyoda-ku, Tokyo (JP)

(72) Inventor: Akihiro Nagata, Hachioji (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 15/589,103

(22) Filed: May 8, 2017

(65) Prior Publication Data
US 2017/0353614 A1 Dec. 7, 2017

(30) Foreign Application Priority Data

Jun. 7, 2016 (JP) .................................. 2016-113492

(51) Int. Cl.
*H04N 1/00* (2006.01)
*H04N 1/21* (2006.01)
(Continued)

(52) U.S. Cl.
CPC .......... *H04N 1/00116* (2013.01); *G06T 11/60* (2013.01); *G11B 27/022* (2013.01);
(Continued)

(58) Field of Classification Search
CPC ................................................ H04N 1/00116
See application file for complete search history.

(56) References Cited

U.S. PATENT DOCUMENTS

| 9,313,361 B2* | 4/2016 | Nakata | G06F 3/1206 |
| 2006/0053042 A1* | 3/2006 | Yoshimura | G06Q 10/02 |
| | | | 705/7.25 |
| 2006/0294453 A1* | 12/2006 | Hirata | G10L 15/26 |
| | | | 715/203 |

FOREIGN PATENT DOCUMENTS

| JP | 2003-339033 | 11/2003 |
| JP | 2009-159446 | 7/2009 |
| JP | 2011-061702 A | 3/2011 |

OTHER PUBLICATIONS

Notice of Reasons for Refusal issued in corresponding Japanese Patent Application No. 2016-113492, dated Jan. 7, 2020 (16 pages).

* cited by examiner

*Primary Examiner* — King Y Poon
*Assistant Examiner* — Michael Burleson
(74) *Attorney, Agent, or Firm* — Buchanan Ingersoll & Rooney PC

(57) ABSTRACT

An image forming apparatus that forms an image on paper in accordance with a printing job includes: a communication unit that receives meeting information concerning a meeting; a storage unit that stores the meeting information received by the communication unit; an editing control unit that edits the meeting information stored in the storage unit in accordance with an execution time of the printing job; an operation display unit that freely outputs images or voices captured in the meeting based on the meeting information edited by the editing control unit; and an output control unit that controls output of the images or voices captured in the meeting and output from the operation display unit, wherein the output control unit finishes output of the images or voices captured in the meeting and output from the operation display unit before completion of the printing job.

12 Claims, 9 Drawing Sheets

(51) Int. Cl.
*G11B 27/031* (2006.01)
*G06T 11/60* (2006.01)
*G11B 27/022* (2006.01)
(52) U.S. Cl.
CPC ....... *G11B 27/031* (2013.01); *H04N 1/00408* (2013.01); *H04N 1/00854* (2013.01); *H04N 1/00875* (2013.01); *H04N 1/2104* (2013.01)

IMAGE FORMING APPARATUS, INFORMATION PROCESSING SYSTEM, IMAGE FORMING METHOD, AND PROGRAM

The entire disclosure of Japanese Patent Application No. 2016-113492 filed on Jun. 7, 2016 including description, claims, drawings, and abstract are incorporated herein by reference in its entirety.

BACKGROUND OF THE INVENTION

Field of the Invention

The present invention relates to an image forming apparatus, an information processing system, an image forming method, and a program.

Description of the Related Art

There has been known an image forming apparatus which functions as a multi-function peripheral (MFP) performing a scanner function, a facsimile function, a copying function, a printer function, a data communication function, or a server function in a company office or like places.

This type of image forming apparatus also provides various supports aimed at meetings. For example, there has been proposed such an image forming apparatus which encourages particular persons planning to participate in a meeting to join the meeting in the middle of the meeting (for example, see JP 2011-061702 A).

A related-art disclosed in JP 2011-061702 A is configured to give notification to particular persons planning to participate in a meeting in the middle of the meeting. For such particular persons, it is preferable to be allowed to participate in the meeting only at the time of discussion on a subject of a high necessity for participation in a plurality of subjects of the meeting, and leave the meeting at the time of discussion on a subject of no necessity for participation.

In this case, the notification needs to indicate not the contents of individual subjects, but chiefly a time series only, such as a progress schedule of the subjects. The notification therefore does not include the contents of the subjects. In this case, unspecified persons not planning to participate in the meeting are difficult to know the contents of the subjects.

Accordingly, even when a meeting to be held is an open meeting intended to collect knowledgeable persons from a variety of fields and gather knowledge for use of solutions to subjects of the meeting, unspecified knowledgeable persons not planning to participate in the meeting are difficult to know the contents of the subjects.

Incidentally, it is possible that such unspecified knowledgeable persons are compelled to wait for completion of a printing job given to each person in front of an image forming apparatus during execution of the printing job. When these unspecified knowledgeable persons are notified about subjects of a meeting during execution of the printing job and in the middle of the meeting, the persons and the knowledge of the persons may be collectable at the meeting from a wide variety of fields.

It is still difficult, however, for the related-art disclosed in JP 2011-061702 A to encourage the persons waiting for completion of the printing job to participate in the meeting as in the foregoing manner.

SUMMARY OF THE INVENTION

The present invention has been developed to solve the aforementioned problems. It is an object of the present invention to provide an image forming apparatus, an information processing system, an image forming method, and a program, as technologies capable of encouraging a person waiting for completion of a printing job to participate in a meeting.

To achieve the abovementioned object, according to an aspect, an image forming apparatus that forms an image on paper in accordance with a printing job, reflecting one aspect of the present invention comprises: a communication unit that receives meeting information concerning a meeting; a storage unit that stores the meeting information received by the communication unit; an editing control unit that edits the meeting information stored in the storage unit in accordance with an execution time of the printing job; an operation display unit that freely outputs images or voices captured in the meeting based on the meeting information edited by the editing control unit; and an output control unit that controls output of the images or voices captured in the meeting and output from the operation display unit, wherein the output control unit finishes output of the images or voices captured in the meeting and output from the operation display unit before completion of the printing job.

According to the image forming apparatus of the aspect, the editing control unit preferably edits the meeting information stored in the storage unit in accordance with progress in the meeting.

According to the image forming apparatus of the aspect, the editing control unit preferably edits a reproduction time of the images or voices captured in the meeting such that the reproduction time becomes the execution time of the printing job or shorter.

According to the image forming apparatus of the aspect, the editing control unit preferably adjusts a ratio of a first reproduction time of edited contents of the meeting information to a second reproduction time of real-time contents of the images or voices captured in the meeting in accordance with a knowledge level of a user who has instructed the printing job.

According to the image forming apparatus of the aspect, the image forming apparatus preferably further comprises: a database that contains a plurality of registered users, and knowledge levels of the plurality of registered users in association with the plurality of registered users; and an authentication unit that authenticates whether or not the user corresponds to one of the plurality of registered users contained in the database, wherein the editing control unit preferably adjusts the ratio of the first reproduction time to the second reproduction time based on the knowledge level of the registered user authenticated by the authentication when the authentication unit authenticates the user as one of the plurality of registered users.

According to the image forming apparatus of the aspect, the image forming apparatus preferably further comprises an analysis unit that analyzes details of the printing job, wherein the editing control unit preferably adjusts the ratio of the first reproduction time to the second reproduction time based on the details of the printing job analyzed by the analysis unit.

According to the image forming apparatus of the aspect, the image forming apparatus preferably further comprises: an audio communication unit that transmits voices of the user to a place where the meeting is being held; and an image transmission unit that transmits images of the user to the place where the meeting is being held.

According to the image forming apparatus of the aspect, the image forming apparatus preferably further comprises a transmission unit that transmits the images or voices captured in the meeting and output from the operation display unit to a terminal.

According to the image forming apparatus of the aspect, the image forming apparatus preferably further comprises a generation unit that generates display contents output from the operation display unit, wherein the generation unit preferably generates selection information for selecting one of meetings, and addition information for adding priority to images captured in the selected meeting based on the knowledge level.

According to the image forming apparatus of the aspect, the image forming apparatus preferably further comprises a clocking unit that clocks an elapsed time from a start time of the meeting to a current time, wherein the output control unit preferably outputs the images or voices captured in the meeting in real time from the operation display unit when the printing job arrives before an elapse of a near-start determination time clocked by the clocking unit.

According to the image forming apparatus of the aspect, the image forming apparatus preferably further comprises an image forming unit that forms an image, wherein the editing control unit preferably outputs summary contents corresponding to a summary of the meeting information from the operation display unit when the printing job arrives after an elapse of a near-end determination time clocked by the clocking unit.

According to the image forming apparatus of the aspect, the image forming apparatus preferably further comprises an image processing unit that forms, on the image forming unit, summary contents corresponding to a summary of the meeting information when the printing job arrives after an elapse of the near-end determination time clocked by the clocking unit.

To achieve the abovementioned object, according to an aspect, an information processing system reflecting one aspect of the present invention comprises: an image forming apparatus described above; a collection unit that collects sound from the meeting; an imaging unit that captures an image of the meeting; and an interface unit that transmits the sound collected by the collection unit from the meeting to the audio communication unit, and transmits the image of the meeting captured by the imaging unit to the image transmission unit.

According to the information processing system, a person waiting for completion of a printing job can be encouraged to participate in a meeting, similarly to encouragement by the image forming apparatus.

To achieve the abovementioned object, according to an aspect, an image forming method performed by an image forming apparatus that forms an image on paper in accordance with a printing job, reflecting one aspect of the present invention comprises: a communication step of receiving meeting information concerning a meeting; a storage step of storing the meeting information received by the communication step; an editing control step of editing the meeting information stored by the storage step in accordance with an execution time of the printing job; an operation display step of freely outputting images or voices captured in the meeting based on the meeting information edited by the editing control step; and an output control step of controlling output of the images or voices captured in the meeting and output by the operation display step, wherein the output control step finishes output of the images or voices captured in the meeting and output by the operation display step before completion of the printing job.

According to the image forming method, a person waiting for completion of a printing job can be encouraged to participate in a meeting, similarly to encouragement by the image forming apparatus.

To achieve the abovementioned object, according to an aspect, a non-transitory recording medium storing a computer readable program reflecting one aspect of the present invention causes a computer controlling an image forming apparatus that forms an image on paper in accordance with a printing job to execute: a communication unit that receives meeting information concerning a meeting; a storage unit that stores the meeting information received by the communication unit; an editing control unit that edits the meeting information stored in the storage unit in accordance with an execution time of the printing job; an operation display unit that freely outputs images or voices captured in the meeting based on the meeting information edited by the editing control unit; and an output control unit that controls output of the images or voices captured in the meeting and output from the operation display unit, wherein the output control unit finishes output of the images or voices captured in the meeting and output from the operation display unit before completion of the printing job.

According to the program, a person waiting for completion of a printing job can be encouraged to participate in a meeting, similarly to encouragement by the image forming apparatus.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, an embodiment of the present invention will be described with reference to the drawings. However, the scope of the invention is not limited to the illustrated examples.

First Embodiment

Figure 1:
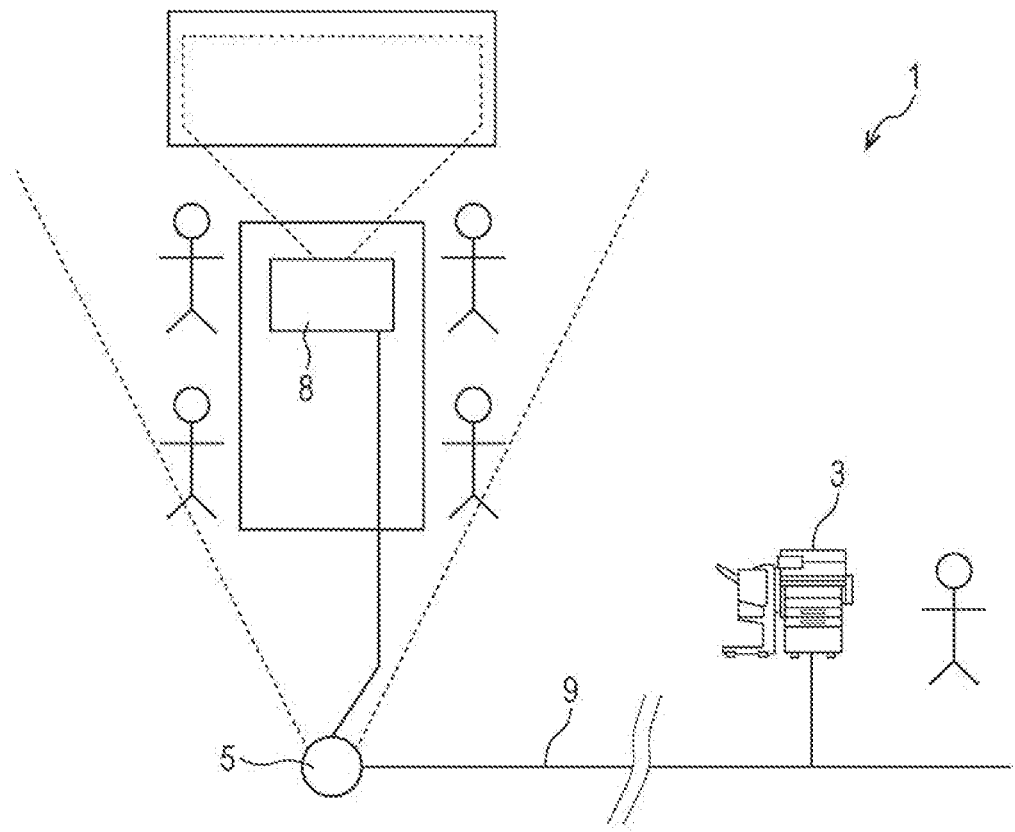
FIG. 1 is a view illustrating an example of a general configuration of an information processing system according to a first embodiment of the present invention.

FIG. 1 is a view illustrating an example of a general configuration of an information processing system 1 according to a first embodiment of the present invention. As illustrated in FIG. 1, an image forming apparatus 3 and a meeting support device 5 are connected to each other via a network 9 in the information processing system 1. The image forming apparatus 3 is configured to perform a function as an MFP, and also to transmit and receive various types of signals to and from the meeting support device 5, as will be detailed below. The meeting support device 5 is installed in a meeting space where a meeting is held, or other places to support the meeting, as will be detailed below. For example, the meeting support device 5 is provided in a meeting space where an open meeting is held to collect knowledgeable persons from a variety of fields, in a state that the image forming apparatus 3 is disposed at an installation place different from the meeting space. In this case, the meeting support device 5 transmits images or voices captured in the meeting space of the open meeting to the image forming apparatus 3 via the network 9. The image forming apparatus 3 reproduces a video containing the images or voices received from the meeting support device 5 after editing, or without editing.

Figure 2:
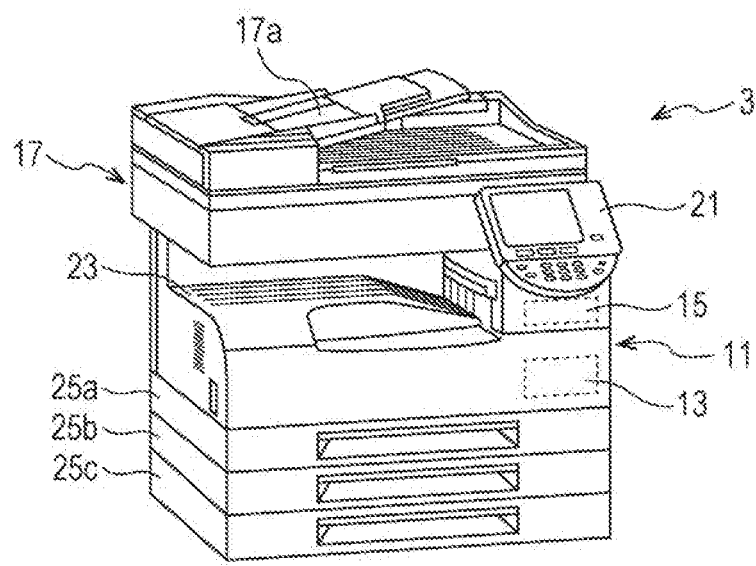
FIG. 2 is a perspective view of an example of an image forming apparatus according to the first embodiment of the present invention.

FIG. 2 is a perspective view of an example of the image forming apparatus 3 according to the first embodiment of the present invention. As illustrated in FIG. 2, the image forming apparatus 3 includes a printer unit 11, a power source unit 13, a control unit 15, a scanner unit 17, an operation display unit 21, a discharge tray 23, paper cassettes 25a to 25c, and others. The printer unit 11, the power source unit 13, and the control unit 15 are contained in a housing of the image forming apparatus 3.

Each of the paper cassettes 25a to 25c is freely drawable from the housing of the image forming apparatus 3. The paper cassettes 25a, 25b, and 25c are hereinafter collectively referred to as paper cassettes 25 where no distinction therebetween is not particularly needed. Each of the paper cassettes 25a, 25b, and 25c stores paper of a size different for each cassette. Sheets of the paper stored in each of the paper cassettes 25 are fed sheet by sheet at the time of printing, and supplied to the printer unit 11. Note that the number of the paper cassettes 25 is not limited to three as specified in the example presented herein.

The discharge tray 23 is located in the housing of the image forming apparatus 3 above an area storing the printer unit 11, and below an area storing the scanner unit 17. A sheet on which an image is formed by the printer unit 11 is discharged from the interior of the housing to the discharge tray 23.

The operation display unit 21 is disposed in an upper part of the image forming apparatus 3, and on the front side where the paper cassettes 25 are freely drawable from the housing. The operation display unit 21 is configured to receive an operation from a user, and freely display at least either a result of the operation received from the user, or an internal status of the image forming apparatus 3, as will be detailed below.

The printer unit 11 forms an image on a sheet stored in one of the paper cassettes 25 or a not-shown manual bypass tray by using an electrographic processing technology, as will be detailed below. The printer unit 11 forms an appropriate color image by synthesizing images in four colors, or five colors including a spot color based on a tandem system.

The scanner unit 17 is disposed in an upper part of the image forming apparatus 3. The scanner unit 17 includes an automatic document feeder 17a. Documents placed on a document tray are sequentially supplied to the scanner unit 17 by the automatic document feeder 17a. An image on each of the supplied documents is read as analog image data by a not-shown image sensor of the scanner unit 17.

Figure 3:
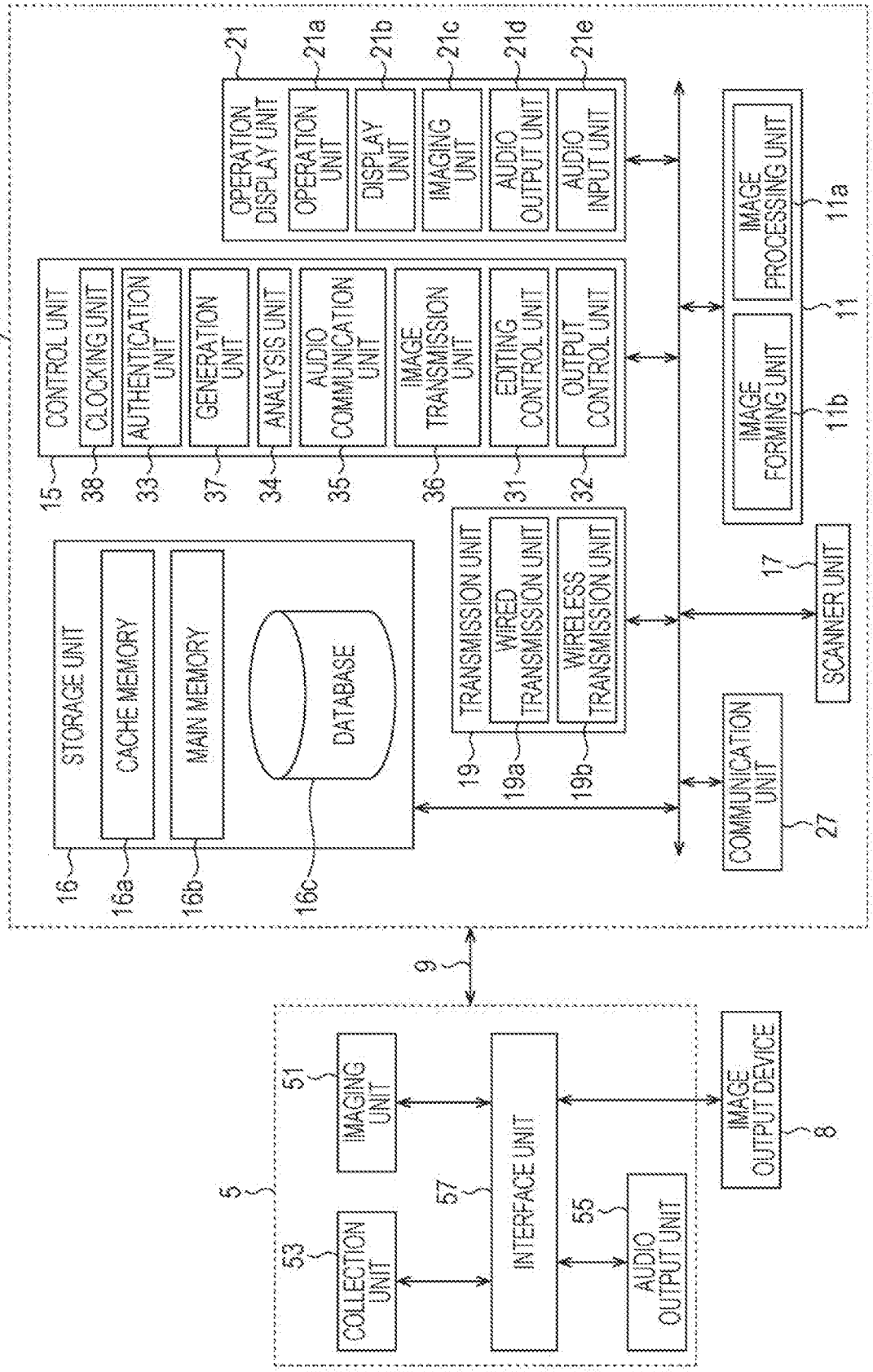
FIG. 3 is a view illustrating a configuration example of functions of the information processing system according to the first embodiment of the present invention.

FIG. 3 is a diagram showing a configuration example of functions of the information processing system 1 according to the first embodiment of the present invention. As shown in FIG. 3, the meeting support device 5 includes an imaging unit 51, a collection unit 53, an audio output unit 55, and an interface unit 57. The imaging unit 51 captures an image of a meeting. The interface unit 57 transmits video data indicating an image of a meeting captured by the imaging unit 51 to the image forming apparatus 3. The collection unit 53 collects voices from the meeting. The interface unit 57 transmits audio data corresponding to voices collected by the collection unit 53 during a meeting to the image forming apparatus 3. The audio output unit 55 outputs voices corresponding to audio data transmitted from the image forming apparatus 3 via the network 9 and the interface unit 57. An image output device 8 is constituted by a projector, for example. The image output device 8 projects video data or image data transmitted from the image forming apparatus 3 or other devices via the network 9 and the interface unit 57 onto a wall, a screen or the like to display the video data or image data.

The image forming apparatus 3 includes a storage unit 16, a transmission unit 19, a communication unit 27 and others, as well as the printer unit 11, the control unit 15, the scanner unit 17, and the operation display unit 21 described above.

The printer unit 11 includes an image processing unit 11a and an image forming unit 11b. The image processing unit 11a performs various types of processing for analog image data read by the image sensor of the scanner unit 17. More specifically, the analog image data is converted into digital image data constituted by RGB codes by analog signal processing, A/D conversion, shading correction, image compression, magnification or the like. The image processing unit 11a further converts digital image data constituted by RGB codes into image data in colors of yellow (Y), magenta (B), cyan (C), and black (K), and transmits a conversion result to the image forming unit 11b.

The image forming unit 11b forms a color image based on image data transmitted from the image processing unit 11a. The image forming unit 11b includes image forming units provided for each color, an intermediate transfer unit, and a fusing unit. In each of the image forming units, a circumference of a photosensitive drum is charged by a charging unit. Light is applied to the photosensitive drum by a writing unit to form an electrostatic latent image thereon. The electrostatic latent image on the photosensitive drum is visualized by a developing unit to form a toner image. The intermediate transfer unit receives toner images transferred from the respective photosensitive drums, and sequentially transfers the toner images on a sheet for each color. The fusing unit fuses the toner images transferred from the intermediate transfer unit.

The operation display unit 21 includes an operation unit 21a, a display unit 21b, and an audio output unit 21d. The operation unit 21a is constituted by a plurality of operation buttons, and configured to receive operations from a user. The display unit 21b is constituted by a touch panel display including a touch panel and a display, and configured to show a guidance screen or other various types of screens to the user. The display unit 21b displays images of the operation buttons operated for touch operations, and receives touch operations from the user. The audio output unit 21d outputs voices corresponding to audio data transmitted from the meeting support device 5 via the network 9.

The operation display unit 21 further includes an imaging unit 21c and an audio input unit 21e. The imaging unit 21c captures an image of the user. Video data corresponding to an image of the user captured by the imaging unit 21c is transmitted to the meeting support device 5 via the network 9. The audio input unit 21e receives voices from the user. Audio data corresponding to voices of the user received by the audio input unit 21e is transmitted to the meeting support device 5 via the network 9.

The communication unit 27 receives meeting information about a meeting. The meeting information about a meeting is constituted by audio data collected by the collection unit 53, and video data captured by the imaging unit 51. The meeting information about a meeting may be data on meeting materials.

The storage unit 16 stores meeting information received via the communication unit 27. The storage unit 16 includes a cache memory 16a, a main memory 16b, and a database 16c, and stores meeting information in the main memory 16b via the cache memory 16a. The database 16c is used at the time of an authentication process detailed below. The database 16c contains a plurality of registered users, and a plurality of knowledge levels of the registered users in association with the registered users.

The transmission unit 19 transmits images or voices captured in a meeting and output from the operation display unit 21 to a terminal. The transmission unit 19 includes a wired transmission unit 19a and a wireless transmission unit 19b. When the terminal is connected to the network 9 by wire, images or voices captured in a meeting are transmitted from the wired transmission unit 19a to the terminal. When the terminal is constituted by a wirelessly connectable device and not connected to the network 9 by wire, images or voices captured in a meeting are transmitted from the wireless transmission unit 19b to the terminal.

While the communication unit 27 and the transmission unit 19 are provided as separate function elements herein, the respective units 27 and 19 may be integrated into one element having a function for transmitting and receiving various types of data.

The control unit 15 includes specific main constituent elements of not-shown central processing unit (CPU), read-only memory (ROM), random-access memory (RAM), and input/output (I/O) interface. The CPU of the control unit 15 reads programs corresponding to processing details from the ROM or the storage unit 16, loads the read programs to the RAM, and operates in cooperation with the loaded programs to control operations of respective units of the image forming apparatus 3.

Accordingly, the control unit 15 for controlling operations of the image forming apparatus 3 is realizable by a microcomputer chiefly constituted by the not-show CPU, ROM, RAM, and I/O interface. Various types of functions such as an editing control unit 31, an output control unit 32, an authentication unit 33, an analysis unit 34, an audio communication unit 35, an image transmission unit 36, a generation unit 37, and a clocking unit 38 are performed under predetermined control programs executed by the control unit 15.

Figure 4:
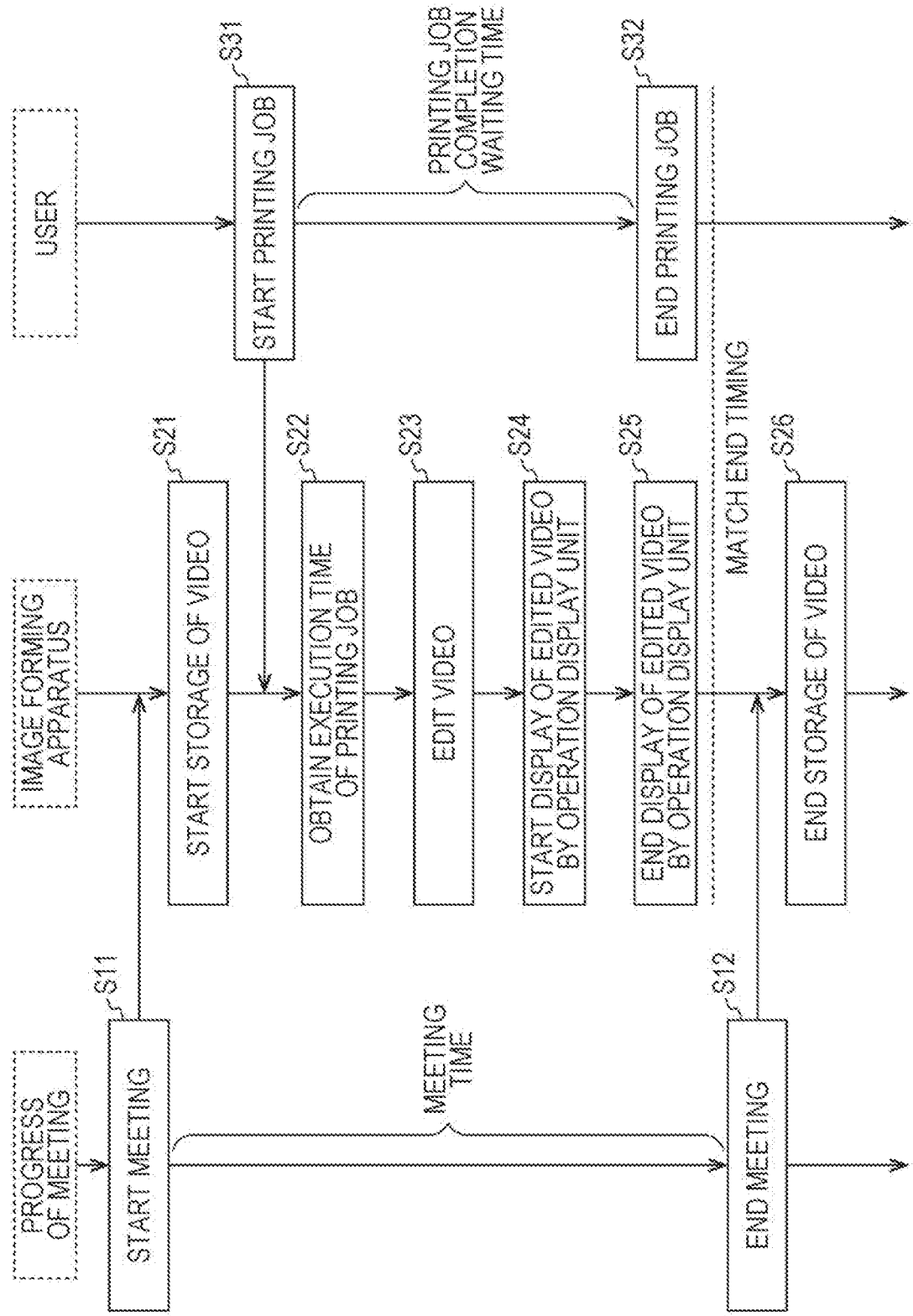
FIG. 4 shows a sequence of a control example according to the first embodiment of the present invention.
Figure 5:
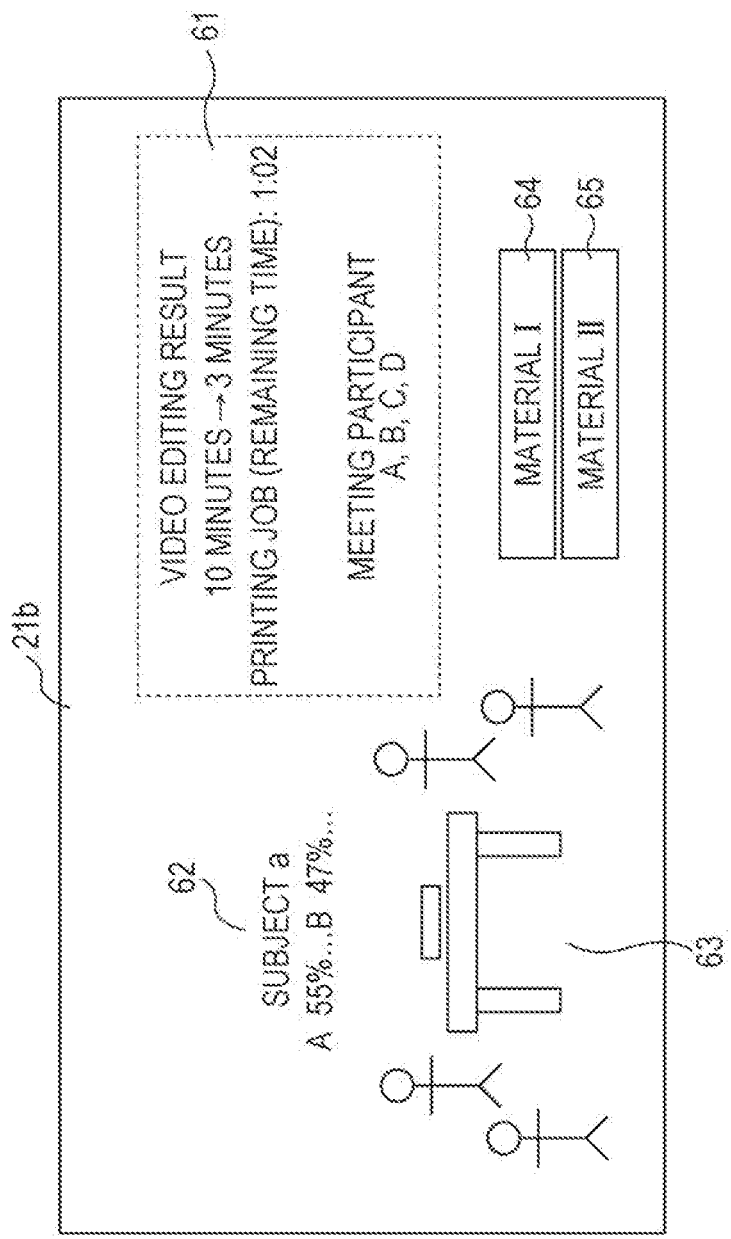
FIG. 5 is a view illustrating an example of meeting information displayed on a display unit of an operation display unit according to the first embodiment of the present invention.
Figure 6:
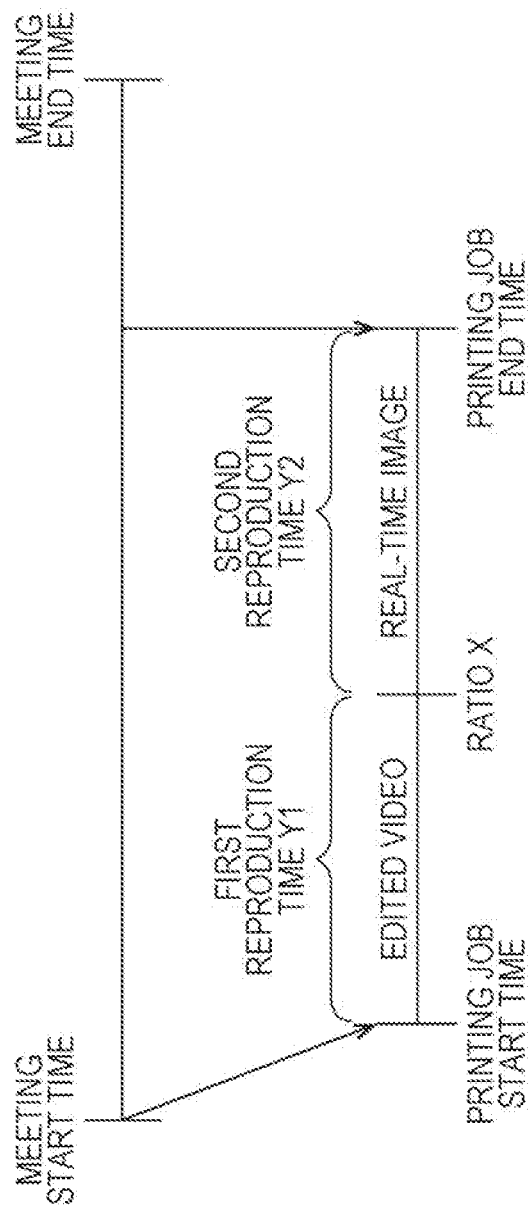
FIG. 6 is a view illustrating an example of switching timing between an edited video and a real-time image contained in meeting information displayed on the display unit of the operation display unit according to the first embodiment of the present invention.
Figure 7:
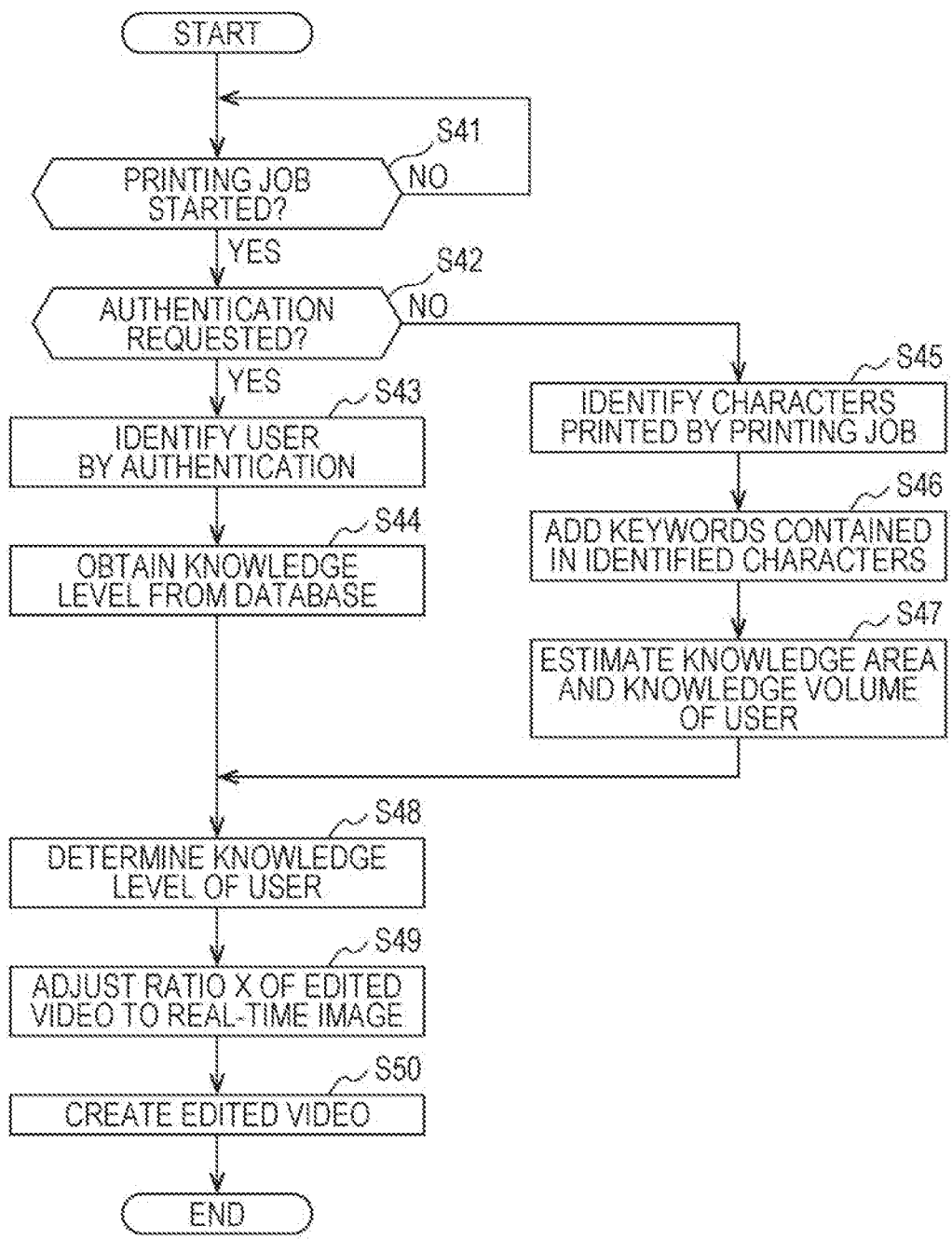
FIG. 7 is a flowchart showing an estimation process of a knowledge level according to the first embodiment of the present invention.

The respective functions performed by the control unit 15 are hereinafter described with reference to FIGS. 4 to 7. FIG. 4 shows a sequence of a control example according to the first embodiment of the present invention. FIG. 5 is a view illustrating an example of meeting information displayed on the display unit 21b of the operation display unit 21 according to the first embodiment of the present invention. FIG. 6 is a view illustrating an example of switching timing between an edited video and a real-time image contained in meeting information displayed on the display unit 21b of the operation display unit 21 according to the first embodiment of the present invention. FIG. 7 is a flowchart showing an estimation process for estimating a knowledge level according to the first embodiment of the present invention.

FIG. 4 shows an example situation that the image forming apparatus 3 receives a printing job from a terminal of a user after a start of a meeting. With a start of the meeting, images or voices captured in the meeting are transmitted from the imaging unit 51 of the meeting support device 5 to the communication unit 27 of the image forming apparatus 3 (S11). The image forming apparatus 3 initiates storage of the videos transmitted from the imaging unit 51 of the meeting support device 5 (S21).

When a printing job is transmitted from the terminal of the user to the image forming apparatus 3 in this condition during the meeting, the image forming apparatus 3 starts the printing job under control by the terminal of the user (S31). The editing control unit 31 of the image forming apparatus 3 obtains an execution time of the printing job, and edits a video by using the images or voices transmitted before the arrival of the printing job to create an edited video (S22, S23). When editing the video, the editing control unit 31 of the image forming apparatus 3 summarizes the video such that the video ends before expiration of the execution time of the printing job. The image forming apparatus 3 starts display of the edited video on the operation display unit 21, and finishes display of the edited video on the operation display unit 21 by the end of a wait time for the printing job (S24, S25, S32). In other words, an end time of processing in step S25 is matched with an end time of processing in step S32. When a meeting end notice is subsequently transmitted from the meeting support device 5 to the image forming apparatus 3, the image forming apparatus 3 ends storage of the video (S12, S26).

As described above, the edited video is a video summarized such that the reproduction time of the video finishes before expiration of the execution time of the printing job. More specifically, any one of following first to fifth processes, or any combination thereof is preferably performed for creation of the edited video.

The first process performs a several-times speed-reproduction process for images or voices. The second process deletes silent scenes possibly generated several times during a meeting. The third process extracts a part for a length of predetermined seconds at intervals of a fixed unit, and joins the extracted parts. For example, a head part for a length of ten seconds is extracted at intervals of five minutes of an original image, and joined with other extracted head parts. The fourth process combines images containing a meeting material appearing in the meeting with images showing the entire meeting to compress meeting information. The fifth process displays participants of the meeting by using a face recognition function. The user identifies the participants of the meeting based on the fifth process. Accordingly, the user easily determines whether or not the meeting includes contents relating to the user based on the fifth process.

FIG. 5 illustrates a display example of an edited video created by performing any one or any combination of the first to fifth processes. As illustrated in FIG. 5, the display unit 21b of the operation display unit 21 displays meeting information concerning the meeting in each of display areas 61 to 65. More specifically, the display area 61 displays video editing result, a remaining time of a printing job, and a list of meeting participants. The display area 62 displays matters concerning a subject a, and the meeting participants. The display area 63 displays the meeting participants of the meeting. The display area 64 displays matters concerning a material I, such as a thumbnail image of the material I. The display area 65 displays matters concerning a material II, such as a thumbnail image of the material II.

The editing control unit 31 edits meeting information to be stored in the storage unit 16 in accordance with the execution time of the printing job. The operation display unit 21 outputs images or voices captured in the meeting based on the meeting information edited by the editing control unit 31. The output control unit 32 controls the images or voices captured in the meeting and output from the operation display unit 21. The output control unit 32 finishes output of the images or voices captured in the meeting from the operation display unit 21 before completion of the printing job.

More specifically, the editing control unit 31 edits the meeting information to be stored in the storage unit 16 in accordance with the progress of the meeting. The editing control unit 31 edits the reproduction time of the images or voices captured in the meeting such that the reproduction finishes before completion of the printing job.

The video edited by the editing control unit 31 is created as a video intended to be presented to the user. However, real-time images may be more appropriate for some users than an edited video is. More specifically, when the user has high-level knowledges, it is more effective to notify the user about the current status of progress of the meeting and encourages the user to participate in the meeting in the execution period of the printing job, rather than to spend this period only for browsing of the edited video by the user. In other words, when the user has high-level knowledges, effective presentation of the meeting information to the user is realizable by switching display between the edited video and the real-time images.

More specifically, it is preferable that a ratio X of a first reproduction time Y1, which is a reproduction time of the edited video as a summary of the images or voices captured in the meeting for a period from a meeting start time to a meeting end time, to a second reproduction time Y2, which is a reproduction time of the real-time images of the current meeting, is set within the period from the meeting start time to the meeting end time as illustrated in FIG. 6. It is preferable that the ratio X is varied in accordance with the knowledge level of the user as illustrated in FIG. 7.

According to an example shown in FIG. 7, in a first case where the user executes a printing job requiring authentication, the knowledge determined based on the database 16c storing the knowledge level of the user, and the personal information about the user in association with the knowledge level. In a second case where the user executes a printing job not requiring authentication, the knowledge level is determined based on the details of a printing job. For example, the knowledge level is determined based on keywords extracted from a plurality of characters printed by the printing job.

In step S41, it is determined whether or not the printing job has started. When it is determined that the printing job has started, the flow proceeds to step S42. When a start of the printing job is not confirmed, the flow returns to step S41.

In step S42, it is determined whether or not an authentication request has been issued. When it is determined that an authentication request has been issued, the flow proceeds to step S43. When issue of an authentication request is not confirmed, the flow proceeds to step S45.

In step S43, the user is identified based on authentication. In step S44, a knowledge level is obtained from the database 16c, whereafter the flow proceeds to step S48.

In step S45, characters to be printed by the printing job are identified based on analysis of the details of the printing job. In step S46, keywords contained in the identified characters are added. In step S47, a knowledge area and a knowledge volume of the user are estimated, whereafter the flow proceeds to step S48.

The process for estimating a knowledge area and a knowledge volume of the user may be executed in accordance with the degree of correlation between keywords stored in the image forming apparatus 3 beforehand, and the identified keywords, for example.

It is assumed, for example, that a keyword group A in A field is included in keyword groups in a plurality of fields contained in the database 16c.

When all of a plurality of identified keywords are contained in the keyword group in A field, it is estimated that the knowledge area of the user is A field, and that the knowledge volume of the user is in a high rank. When a part of the plurality of identified keywords are contained in the keyword group in A field with a part of the other identified keywords similar to the keyword group in A field but not correctly used, it is estimated that the knowledge area of the user is A field, and that the knowledge volume of the user is in a middle rank. When the plurality of identified keywords are similar to the keyword group in A group but not correctly used, it is estimated that the knowledge area of the user is A field, and that the knowledge volume of the user is in a low rank.

When none of the plurality of identified keywords is contained in the keyword group in A field unlike the above cases, for example, the knowledge area of the user is not A field. In this case, the identified keywords are compared with keyword groups in other fields.

Note that the process for estimating the knowledge area and the knowledge volume of the user is not particularly limited to the example presented herein.

In step S48, the knowledge level of the user is determined. In step S49, the ratio X of the edited video to the real-time image is adjusted. In step S50, the edited video is created.

In this case, the ratio X of the first reproduction time Y1, which is a time for reproducing the edited contents indicating the meeting information, to the second reproduction time Y2, which is a time for reproducing the real-time contents indicating the images or voices captured in the meeting, is adjusted by the editing control unit 31 in accordance with the knowledge level of the user having instructed the printing job.

More specifically, the authentication unit 33 authenticates whether or not the user is one of a plurality of registered users registered in the database 16c. When it is authenticated by the authentication unit 33 that the user is one of the plurality of registered users, the editing control unit 31 adjusts the ratio X of the first reproduction time Y1 to the second reproduction time Y2 based on the knowledge level of the registered user authenticated by the authentication unit 33.

The analysis unit 34 analyzes the details of the printing job. The editing control unit 31 adjusts the ratio X of the first reproduction time Y1 to the second reproduction time Y2 based on the details of the printing job analyzed by the analysis unit 34.

Note that the user is capable of participating in a remote open meeting by using the imaging unit 21c and the audio input unit 21e during display of real-time images. More specifically, the audio input unit 21e transmits voices of the user to the outside in cooperation with the audio communication unit 35. The audio communication unit 35 transmits the voices of the user to a place where the meeting is being held. The imaging unit 21c transmits images of the user to the outside in cooperation with the image transmission unit 36. The image transmission unit 36 transmits the images of the user to a place where a meeting is being held.

In addition, the meeting support device 5 is capable of directly communicating with a mobile terminal, such as a smartphone of the user, at an appropriate time by using a dedicated application installed in the mobile terminal. Accordingly, even after leaving the image forming apparatus 3 in the middle of the meeting, the user is capable of continuously and seamlessly participating in the meeting by using a meeting function transferred to the mobile terminal.

More specifically, the transmission unit 19 transmits images or voices captured in the meeting and output from the operation display unit 21 to the terminal. In this case, the terminal to which the images or voices captured in the meeting are transmitted may be either the terminal of the user having transmitted the printing job to the image forming apparatus 3, or the mobile terminal described above.

Note that only the user waiting for completion of the printing job needs to be encouraged to participate in the meeting. In this case, the user having transmitted the printing job to the image forming apparatus 3 may be encouraged to participate in the meeting based on the images or voices captured in the meeting and displayed on the display unit 21b of the operation display unit 21 as a consequence of a state that the user having transmitted the printing job to the image forming apparatus 3 stands in front of the image forming apparatus 3.

Accordingly, when a camera and a microphone included in the mobile terminal are configured to substitute for the functions of the audio input unit 21e and the imaging unit 21c, the user may participate in a remote open meeting by linkage between the mobile terminal and the image forming apparatus 3 including the audio communication unit 35 and the image transmission unit 36 in a state of connection between the mobile terminal, the image forming apparatus 3, and the meeting support device 5 until completion of the printing job. After completion of the printing job, the user may participate in the remote open meeting in a state of connection between the mobile terminal and the meeting support device 5 in the manner described above.

As described above, output of images or voices captured in the meeting from the operation display unit 21 finishes before completion of the printing job according to this embodiment. In this case, the user waiting for completion of the printing job is notified about the contents of the meeting. Accordingly, the user waiting for completion of the printing job is encouraged to participate in the meeting by this notification.

In other words, an edited video of the meeting is presented to the user in a free time of the user corresponding to a waiting time for completion of the printing job to effectively supply the contents of the meeting to the user using the image forming apparatus 3 in a period of free time of the user. Moreover, the highly realistic edited video captured in the meeting and presented to the user using the image forming apparatus 3 attracts interest in the contents of the meeting from the user, and encourages the user to participate in the open meeting.

The images captured in the meeting and output from the operation display unit 21 may be either still images or moving images. The images captured in the meeting and output from the operation display unit 21 may be color images or monochrome images. The images and voices captured in the meeting and output from the operation display unit 21 may be simultaneously output, or only either the images or the voices may be output.

According to this embodiment, the meeting information is edited in accordance with the progress of the meeting. In this case, the meeting information is reconfigured in accordance with the progress of the meeting. Accordingly, reconfiguration of the meeting information is realizable in accordance with the time of progression in the meeting from the start to the current time of the meeting.

According to this embodiment, the reproduction time of the images or voices captured in the meeting is set to the execution time of the printing job or shorter by editing. In this case, reproduction of the images or voices captured in the meeting finishes before completion of the printing job. Accordingly, utilization of the execution time of the printing job is achievable for reproduction of the images or voices captured in the meeting.

According to this embodiment, the ratio X of the reproduction time for reproducing the editing contents indicating the meeting information edited, to the reproduction time for reproducing the real-time contents indicating the images or voices captured in the meeting is adjusted in accordance with the knowledge level of the user having instructed the printing job. In this case, the user is notified about contents appropriate for the user for a longer time than contents inappropriate. Accordingly, encouragement given to the user for participation in the meeting becomes more positive.

According to this embodiment, the ratio X of the first reproduction time Y1 to the second reproduction time Y2 is adjusted based on the knowledge level of the registered user authenticated by the authentication unit 33 when the user is authenticated as one of the plurality of registered users by the authentication unit 33. In this case, the ratio X of the first reproduction time Y1 to the second reproduction time Y2 is adjustable appropriately for the registered user authenticated through the authenticating operation. Accordingly, accurate adjustment of the ratio X of the first reproduction time Y1 to the second reproduction time Y2 is realizable.

According to this embodiment, the ratio X of the first reproduction time Y1 to the second reproduction time Y2 is adjusted based on the details of the printing job analyzed by the analysis unit 34. In this case, the ratio X of the first reproduction time Y1 to the second reproduction time Y2 is adjusted based on the details of the printing job when the authenticating operation is not performed. Accordingly, accurate adjustment of the ratio X of the first reproduction time Y1 to the second reproduction time Y2 is realizable.

According to this embodiment, voices and videos of the user are transmitted to the place where the meeting is held, by using the audio communication unit 35 which transmits the voices of the user to the place of the meeting, and the image transmission unit 36 which transmits the images of the user to the place of the meeting. Accordingly, the user is capable of participating in the meeting even when the user is located at a position away from the place of the meeting.

According to this embodiment, images or voices captured in the meeting are transmitted to the terminal. In this case, images and voices of the user are transmitted via the terminal to the place where the meeting is held. Accordingly, the user is capable of participating in the meeting even when the user is located at a position away from the image forming apparatus 3.

Second Embodiment

In a second embodiment, constituent parts similar to corresponding constituent parts in the first embodiment have been given similar reference numbers, and the same description of these constituent parts is not repeated. Discussed in the second embodiment is an example of meetings simultaneously held at a plurality of places.

Figure 8:
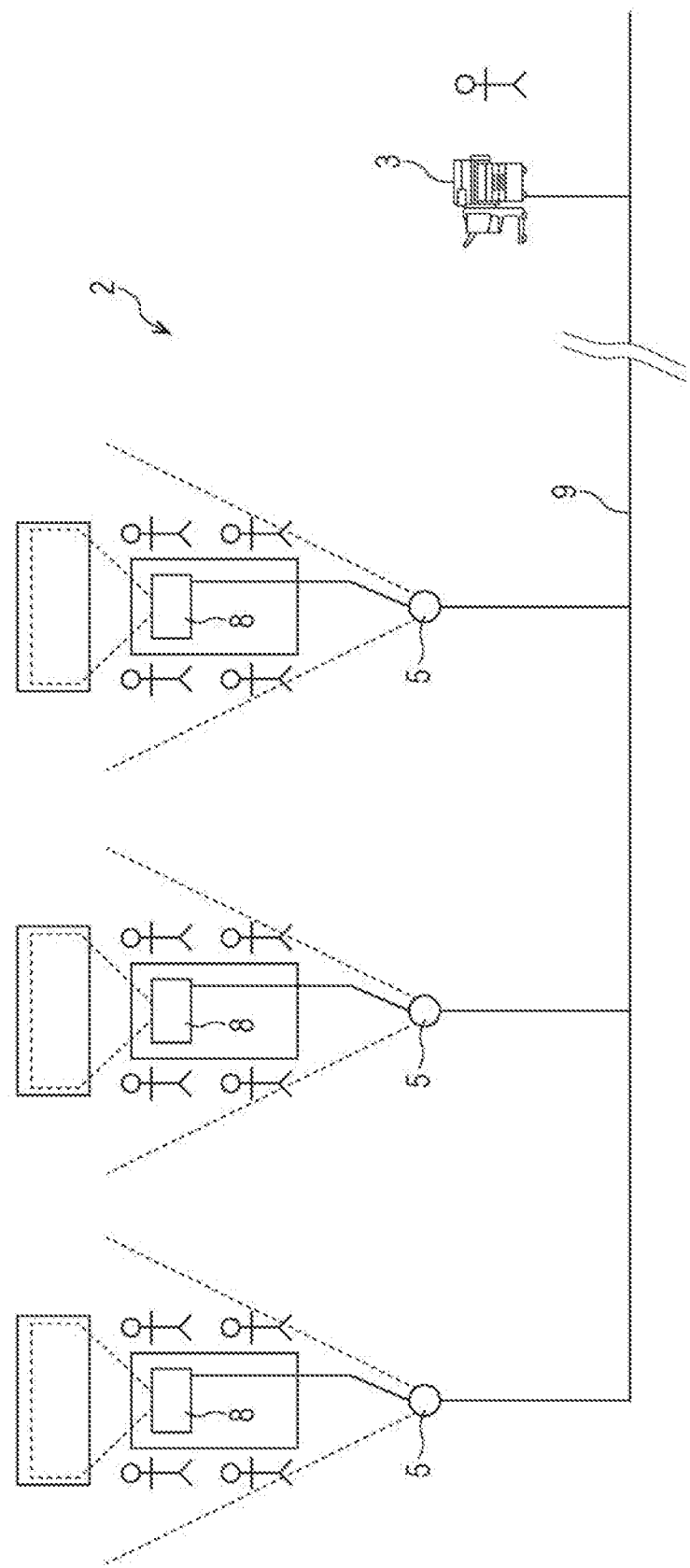
FIG. 8 is a view illustrating an example of a general configuration of an information processing system according to a second embodiment of the present invention.

FIG. 8 is a view illustrating an example of a general configuration of an information processing system 2 according to the second embodiment of the present invention. As illustrated in FIG. 8, three meetings are simultaneously in progress. In this case, the number of videos displayed on the operation display unit 21 may be regulated in accordance with the knowledge level of the user.

Figure 9:
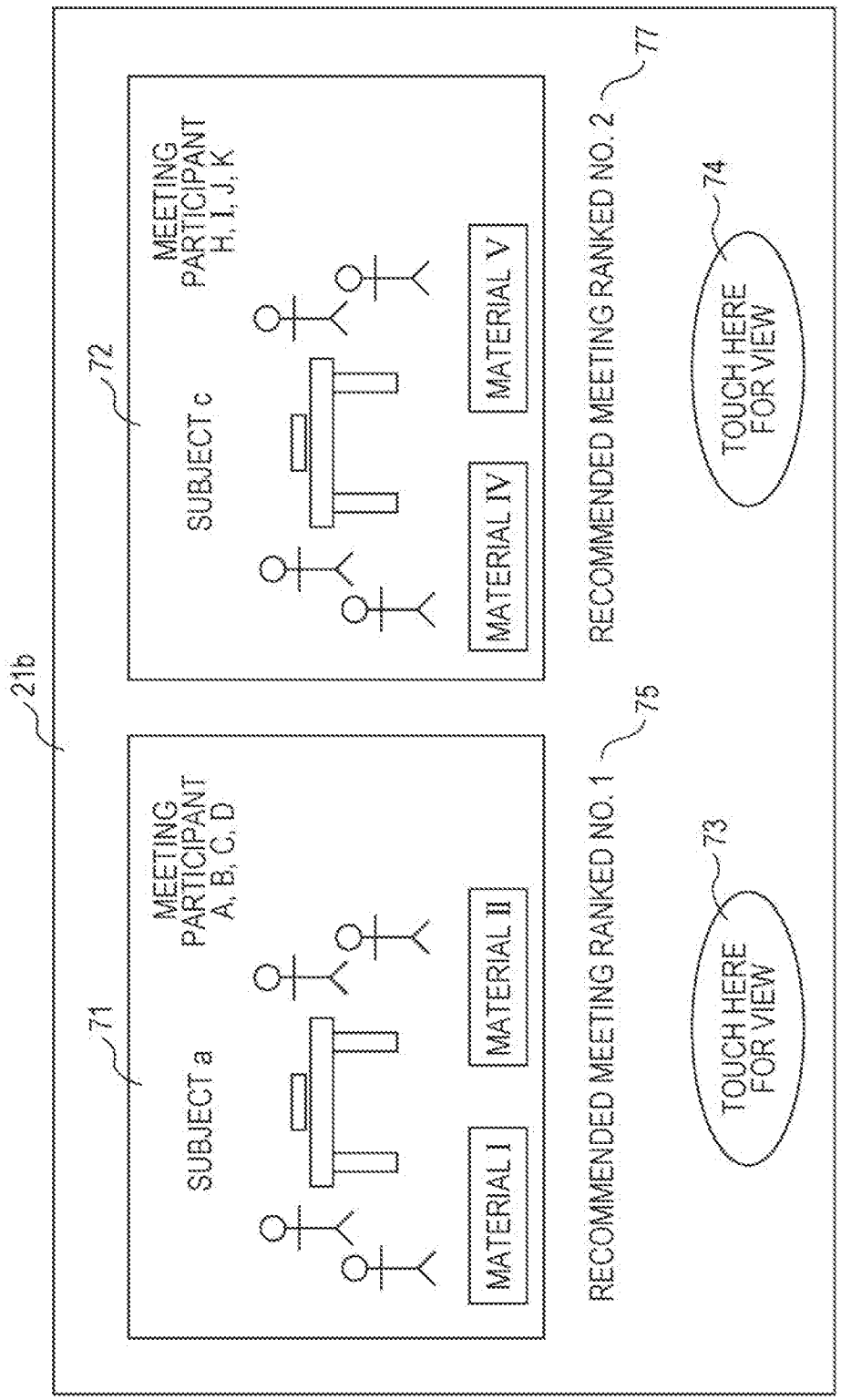
FIG. 9 is a view illustrating an example of meeting information displayed on the display unit of the operation display unit according to the second embodiment of the present invention.

FIG. 9 is a view illustrating an example of meeting information displayed on the display unit 21b of the operation display unit 21 according to the second embodiment of the present invention. As illustrated in FIG. 9, reproduced are edited videos of two meetings determined as appropriate for the knowledge level of the user in the three meetings simultaneously in progress. The user touches either a display area 73 or a display area 74 at an appropriate time to select and reproduce one of the meetings.

More specifically, the generation unit 37 generates display contents to be output from the operation display unit 21. In more detail, the generation unit 37 generates selection information for selecting one of the meetings, and addition information for adding priority to images captured in the meeting based on the knowledge level.

For example, a display area 71 shows a list of meeting participants, thumbnail images of the material I and the material II, and images of the meeting participants for the subject a as illustrated in FIG. 9. A display area 72 shows a list of meeting participants, thumbnail images of material IV and material V, and images of the meeting participants for a subject c. Each of display areas 73 and 74 shows an image of a selection button. The image of each selection button corresponds to selection information for selecting one of the meetings. Each of display areas 75 and 77 displays an image of the degree of recommendation of the meeting with a rank. The image of the degree of recommendation of each meeting corresponds to the addition information for adding priority to the images captured in the meeting based on the knowledge level.

As described above, there are generated the selection information for selecting one of the meetings, and the addition information for adding priority to the images captured the meeting based on the knowledge level according to this embodiment. In this case, the user is encouraged to participate in the meeting in accordance with priority determined based on the knowledge level of the user. Accordingly, participation in the meeting by a person having a higher level of knowledge about the contents of the meeting is realizable.

Third Embodiment

In a third embodiment, constituent parts similar to corresponding constituent parts in the first and second embodiments have been given similar reference numbers, and the same description of these constituent parts is not repeated. Discussed in the third embodiment is an example of meeting information presented to a user at a time close to an end of a meeting.

Following situations may be caused in accordance with a request time for requesting a printing job to the image forming apparatus 3 by the user, and progress of a meeting. A first situation is that the printing job starts within a predetermined time from the start of the meeting. For example, the printing job starts after an elapse of 2 minutes from the meeting start in the one-hour meeting. A second situation is that the printing job starts within a predetermined time before the end of the meeting. For example, the printing job starts after an elapse of 55 minutes from the start of the meeting in the one-hour meeting.

In the first situation, images or voices sufficient for creation of an edited video are not yet stored in the storage unit 16. Accordingly, images or voices currently captured from the meeting space of the meeting are reproduced on the display unit 21b of the operation display unit 21 of the image forming apparatus 3 without creating an edited video to transmit the meeting information to the user.

According to the second situation, it is assumable that the meeting ends before completion of viewing of the edited video of the meeting. Accordingly, summarized contents of the meeting information in the form of minutes of proceedings are displayed rather than an edited video of the meeting in consideration of the importance of compression of the meeting information. In this case, the meeting information summarized in the form of minutes of proceedings may be printed.

Figure 10:
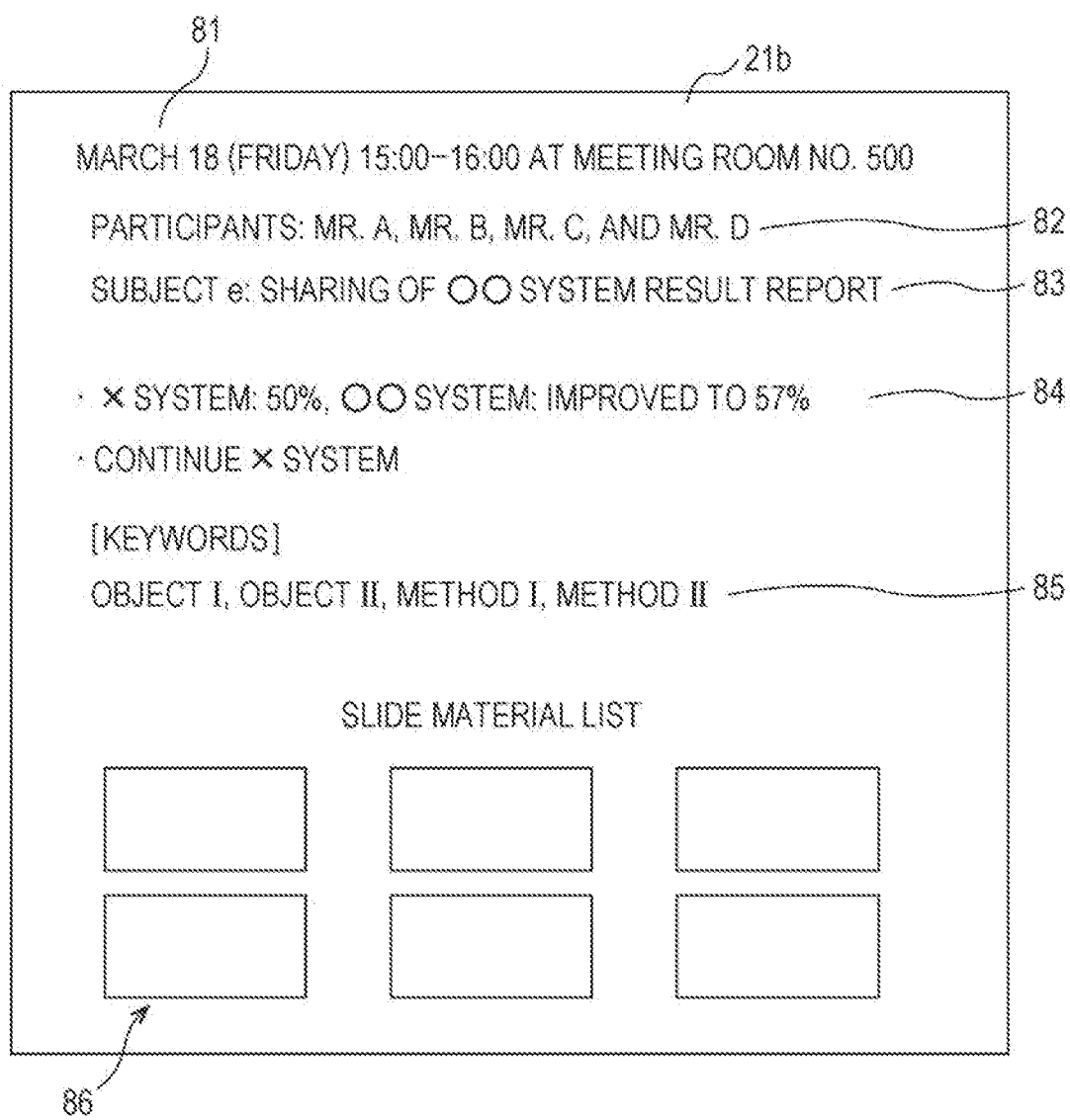
FIG. 10 is a view illustrating an example of a summary material for a meeting displayed on the display unit of the operation display unit according to a third embodiment of the present invention.

FIG. 10 is a view illustrating an example of a summary material concerning the meeting and displayed on the display unit 21b of the operation display unit 21 according to the third embodiment of the present invention. The example illustrated in FIG. 10 corresponds to the second situation described above. As illustrated in FIG. 10, a display area 81 shows the date and time of the meeting, and the place where the meeting is being held. A display area 82 shows a list of meeting participants. A display area 83 shows a subject e of the meeting. A display area 84 shows an investigation result of the subject e. A display area 85 shows keywords in the meeting material. A display area 86 shows thumbnail images of a slide material list as the meeting material.

More specifically, the clocking unit 38 clocks an elapsed time from, the start time of the meeting to the current time. The output control unit 32 outputs images or voices captured in the meeting through the operation display unit 21 in real time when a printing job arrives before an elapse of a near-start determination time clocked by the clocking unit 38. The near-start determination time herein refers to a threshold for determining whether or not the current time is close to the meeting start time. The near-start determination time is set to 2 minutes in the first situation, for example. However, the near-start determination time is not limited to this specific example.

The editing control unit 31 outputs the summary contents of the meeting information from the operation display unit 21 when a printing job arrives after an elapse of a near-end determination time clocked by the clocking unit 38. The near-end determination time herein refers to a threshold for determining whether or not the current time is close to the meeting end time. The near-end determination time is set to 55 minutes in the second situation, for example. However, the near-end determination time is not limited to this specific example.

The image processing unit 11a may form, on the image forming unit 11b, the summary contents of the meeting information when a printing job arrives after an elapse of the near-end determination time clocked by the clocking unit 38. In this case, the summary contents of the meeting information are printed, wherefore the printed matter thus produced may be used by the user as a summary material. For example, the user may refer to the printed matter after the meeting ends. Accordingly, discussion about the contents of the meeting between the user and at least one of the meeting participants is realizable.

According to this embodiment described above, images or voices captured in the meeting are output from the operation display unit 21 in real time when a printing job arrives before an elapse of the near-start determination time clocked by the clocking unit 38. In this case, the images and voices captured in the meeting are output in real time immediately after the start of the meeting without editing meeting information. Accordingly, brief notification about the contents of the meeting is given even immediately after the start of the meeting.

According to this embodiment, summary contents of the meeting information are output from the operation display unit 21 when a printing job arrives after an elapse of the near-end determination time clocked by the clocking unit 38. In this case, notification about the summary contents of the meeting information is issued immediately before the end of the meeting without output of images or voices captured in the meeting in real time. Accordingly, brief notification about the contents of the meeting is given even immediately before the end of the meeting.

According to this embodiment, the summary contents of the meeting information may be formed on the image forming unit 11b when a printing job arrives after an elapse of the near-end determination time clocked by the clocking unit 38. In this case, notification about the summary contents of the meeting information is issued immediately before the end of the meeting without output of images or voices captured in the meeting in real time. Accordingly, brief notification about the contents of the meeting is given even immediately before the end of the meeting.

The present invention is not limited to the image forming apparatus 3 and the information processing systems 1 and 2 according to the respective embodiments described herein, but may be modified without departing from the scope of the present invention.

For example, while the audio output unit 21d is included in the operation display unit 21 in the respective embodiments described herein, the present invention is not limited to this specific example. The audio output unit 21d may be provided separately from the operation display unit 21, for example.

While the display unit 21b is a touch panel display according to the respective embodiments described herein, the display unit 21b may be a display not provided with a touch panel. In addition, the configuration of the display is not particularly limited, but may be constituted by either a liquid crystal display or an organic electroluminescence (EL) display.

While the imaging unit 21c and the audio input unit 21e are included in the operation display unit 21 in the respective embodiments described herein, the present invention is not limited to this specific example. For example, the imaging unit 21c and the audio input unit 21e may be provided at positions away from the operation display unit 21.

While the meeting support device 5 is disposed at the place where the meeting is being held according to the respective embodiments described herein, the present invention is not limited to this specific example. For example, a smartphone may be used at the place where the meeting is being held. In this case, the smartphone transmits images or voices captured in the meeting to the image forming apparatus 3 to realize functions similar to the corresponding functions described above. In other words, any configuration capable of transmitting images or voices captured in the meeting to the image forming apparatus 3 is adoptable.

While the material I or the like contained in the edited video is displayed on the display unit 21b of the operation display unit 21 as a thumbnail image according to the respective embodiments described herein, the present invention is not limited to this specific example. For example, a title of the material I or the like may be displayed. A thumbnail image may contain a selected page in the material I or the like.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus that forms an image on paper in accordance with a printing job, the image forming apparatus comprising:
   a communication unit that receives meeting information concerning a meeting, the meeting information including a video comprising images and voices captured in the meeting;
   a storage unit that stores the meeting information received by the communication unit;
   an editing control unit that edits the meeting information stored in the storage unit in accordance with an execution time of the printing job, the editing control unit being configured to edit a reproduction time of the meeting information such that the reproduction time is at most the execution time of the printing job;
   an operation display unit that freely outputs the images or voices captured in the meeting based on the meeting information edited by the editing control unit; and
   an output control unit that controls output of the images or voices captured in the meeting and output from the operation display unit,
   wherein:
   the output control unit finishes output of the images or voices captured in the meeting and output from the operation display unit before completion of the printing job;
   the editing control unit edits the meeting information stored in the storage unit in accordance with progress in the meeting;
   the editing control unit edits a reproduction time of the images or voices of the meeting information such that the reproduction time becomes the execution time of the printing job or shorter; and the editing control unit adjusts a ratio of a first reproduction time of edited contents of the meeting information to a second reproduction time of real-time contents of the images or voices captured in the meeting in accordance with a knowledge level of a user who has instructed the printing job.

2. The image forming apparatus according to claim 1, further comprising: a database that contains a plurality of registered users, and knowledge levels of the plurality of registered users in association with the plurality of registered users; and an authentication unit that authenticates whether or not the user corresponds to one of the plurality of registered users contained in the database, wherein the editing control unit adjusts the ratio of the first reproduction time to the second reproduction time based on the knowledge level of the registered user authenticated by the authentication when the authentication unit authenticates the user as one of the plurality of registered users.

3. The image forming apparatus according to claim 2, further comprising
an analysis unit that analyzes details of the printing job, wherein
the editing control unit adjusts the ratio of the first reproduction time to the second reproduction time based on the details of the printing job analyzed by the analysis unit.

4. The image forming apparatus according to claim 3, further comprising:
an audio communication unit that transmits voices of the user to a place where the meeting is being held; and
an image transmission unit that transmits images of the user to the place where the meeting is being held.

5. The image forming apparatus according to claim 4, further comprising
a transmission unit that transmits the images or voices captured in the meeting and output from the operation display unit to a terminal.

6. The image forming apparatus according to claim 5, further comprising
a generation unit that generates display contents output from the operation display unit, wherein
the generation unit generates selection information for selecting one of meetings, and addition information for adding priority to images captured in the selected meeting based on the knowledge level.

7. The image forming apparatus according to claim 6, further comprising
a clocking unit that clocks an elapsed time from a start time of the meeting to a current time, wherein
the output control unit outputs the images or voices captured in the meeting in real time from the operation display unit when the printing job arrives before an elapse of a near-start determination time clocked by the clocking unit.

8. The image forming apparatus according to claim 7, further comprising
an image forming unit that forms an image, wherein
the editing control unit outputs summary contents corresponding to a summary of the meeting information from the operation display unit when the printing job arrives after an elapse of a near-end determination time clocked by the clocking unit.

9. The image forming apparatus according to claim 8, further comprising
an image processing unit that forms, on the image forming unit, summary contents corresponding to a summary of the meeting information when the printing job arrives after an elapse of the near-end determination time clocked by the clocking unit.

10. An information processing system comprising:
an image forming apparatus according to claim 4;
a collection unit that collects sound from the meeting;
an imaging unit that captures an image of the meeting; and
an interface unit that transmits the sound collected by the collection unit from the meeting to the audio communication unit, and transmits the image of the meeting captured by the imaging unit to the image transmission unit.

11. An image forming method performed by an image forming apparatus that forms an image on paper in accordance with a printing job, the image forming method comprising:
a communication step of receiving meeting information concerning a meeting, the meeting information including a video comprising images and voices captured in the meeting;
a storage step of storing the meeting information received by the communication step;
an editing control step of editing the meeting information stored by the storage step in accordance with an execution time of the printing job, the editing control step editing a reproduction time of the meeting information such that the reproduction time is at most the execution time of the printing job;
an operation display step of freely outputting the images or voices captured in the meeting based on the meeting information edited by the editing control step; and
an output control step of controlling output of the images or voices captured in the meeting and output by the operation display step,
wherein:
the output control step finishes output of the images or voices captured in the meeting and output by the operation display step before completion of the printing job;
the editing control step edits the meeting information stored in the storage unit in accordance with progress in the meeting;
the editing control step edits a reproduction time of the images or voices of the meeting information such that the reproduction time becomes the execution time of the printing job or shorter; and
the editing control step adjusts a ratio of a first reproduction time of edited contents of the meeting information to a second reproduction time of real-time contents of the images or voices captured in the meeting in accordance with a knowledge level of a user who has instructed the printing job.

12. A non-transitory recording medium storing a computer readable program for causing a computer controlling an image forming apparatus that forms an image on paper in accordance with a printing job to execute:
a communication unit that receives meeting information concerning a meeting, the meeting information including a video comprising images and voices captured in the meeting;
a storage unit that stores the meeting information received by the communication unit;
an editing control unit that edits the meeting information stored in the storage unit in accordance with an execution time of the printing job, the editing control step being configured to edit a reproduction time of the meeting information such that the reproduction time is at most the execution time of the printing job;

an operation display unit that freely outputs the images or voices captured in the meeting based on the meeting information edited by the editing control unit; and an output control unit that controls output of the images or voices captured in the meeting and output from the operation display unit, wherein:

the output control unit finishes output of the images or voices captured in the meeting and output from the operation display unit before completion of the printing job;

the editing control step edits the meeting information stored in the storage unit in accordance with progress in the meeting;

the editing control step edits a reproduction time of the images or voices of the meeting information such that the reproduction time becomes the execution time of the printing job or shorter; and the editing control step adjusts a ratio of a first reproduction time of edited contents of the meeting information to a second reproduction time of real-time contents of the images or voices captured in the meeting in accordance with a knowledge level of a user who has instructed the printing job.

* * * * *